United States Patent [19]

Bergmann

[11] Patent Number: 4,524,685

[45] Date of Patent: Jun. 25, 1985

[54] EQUIPMENT FOR COMPACTING TRASH CONSISTING OF PACKING MATERIALS AND EASILY COMPRESSED WASTES

[76] Inventor: Heinz Bergmann, Im Ründrdiek 1, D-4474 Lathen, Fed. Rep. of Germany

[21] Appl. No.: 542,231

[22] Filed: Oct. 14, 1983

[30] Foreign Application Priority Data

Oct. 15, 1982 [DE] Fed. Rep. of Germany ....... 3238261
Jul. 19, 1983 [DE] Fed. Rep. of Germany ....... 3326007

[51] Int. Cl.³ .............................................. B30B 3/02
[52] U.S. Cl. ...................................... 100/210; 100/68; 100/229 A; 100/255; 100/295
[58] Field of Search .................... 100/68, 210, 65, 295, 100/155 R, 83, 229 A, 255; 56/344, 346; 414/300, 313

[56] References Cited

U.S. PATENT DOCUMENTS

| | | | |
|---|---|---|---|
| 641,084 | 1/1900 | Cross | 100/210 |
| 3,881,409 | 5/1975 | Frigieri | 100/68 |
| 4,226,565 | 10/1980 | Lipp | 100/210 X |
| 4,426,925 | 1/1984 | Bergmann | 100/210 X |

FOREIGN PATENT DOCUMENTS 2655314 6/1978 Fed. Rep. of Germany ...... 100/210
566503 9/1957 Italy ...................................... 100/68

*Primary Examiner*—Billy J. Wilhite
*Attorney, Agent, or Firm*—Wells & Wells

[57] ABSTRACT

Equipment for compacting trash consisting of packaging materials and easily compressed wastes, such as cardboard, light plastic and wood packings, paper, wastes of blanks and wood, plastic and metal chips held in containers open at the top using a compacting roller entering the container and therein circularly revolving on the trash and held by a post reaching above the container, this roller performing a relative motion with respect to the container during the compaction while the contents are rising is desired to be so designed as to suffice with relatively few parts, that it be resistant to malfunction and suited to receive bulky trash.

The invention to that end provides a vertical shaft mounted to the arm of the post reaching above the trash container, this shaft being equipped at its lower end with at least one horizontal support about which the roller is rotatably supported, the roller resting on the trash by its own weight and the arm being one part of a lift device on the side of the post whereby a stroke by the roller is possible due to its own weight, the roller being subjected to a continuously alternating forward and backward motion.

40 Claims, 9 Drawing Figures

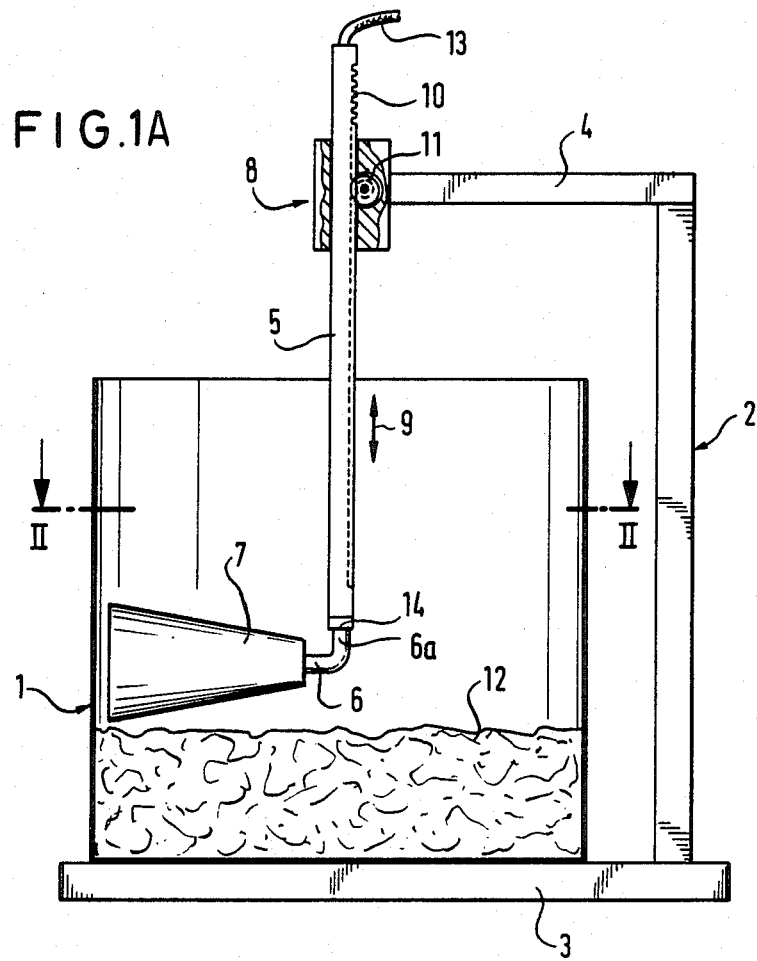

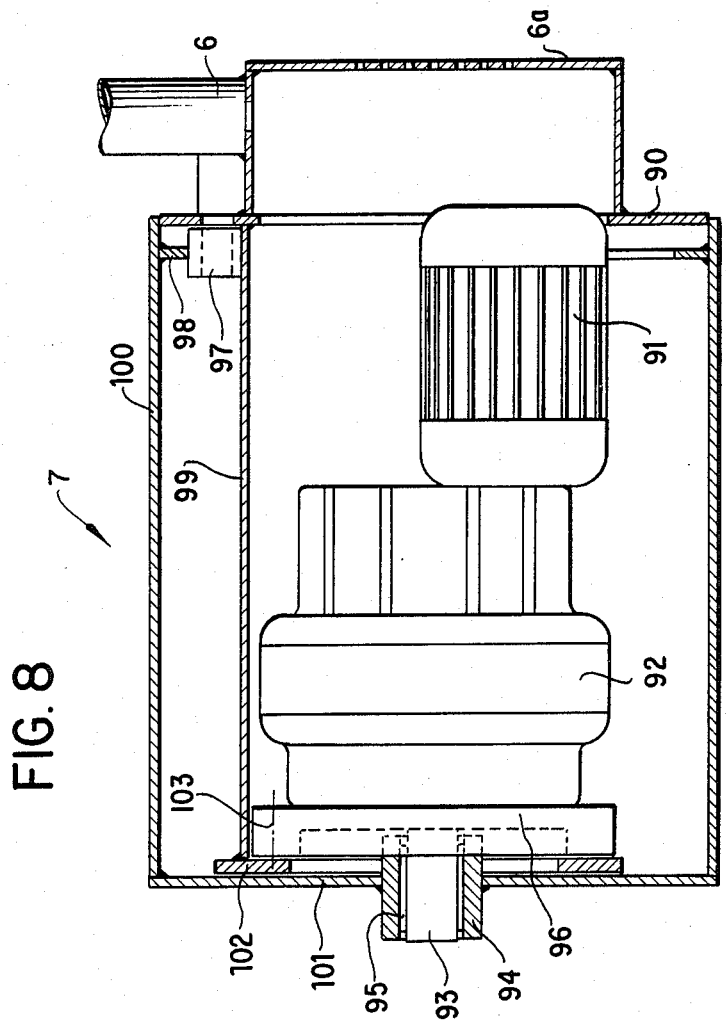

EQUIPMENT FOR COMPACTING TRASH CONSISTING OF PACKING MATERIALS AND EASILY COMPRESSED WASTES

BACKGROUND OF THE INVENTION

The invention concerns equipment for compacting trash consisting of packing materials and easily compressed wastes, for instance cardboards, light plastic and wood packaging, paper, wastes from blanks and wood, plastic and metal chips, the compaction taking place in containers open at the top by means of a compacting roller penetrating said container, rotating circularly on the trash and supported from a post reaching above the container, said roller moving relative to the container during the compaction as the filled portion of the container increases.

In a known design of this type, the compacting roller is mounted on the lower end of a feed screw and compacts the trash supplied by this screw, the relative motion between the roller and the trash in the container being implemented by the container or its bottom being raised during compaction.

This arrangement incurs the drawback that only comparatively minor amounts of trash can be compacted by this trash being lifted toward the roller unless the lifting forces be so large that the equipment design becomes uneconomical. Another drawback of the known equipment is that because of its conveyor combination of roller and screw, it is relatively complex, costly and susceptible to malfunction. Furthermore this known equipment is wholly unsuited for bulky trash, which is the case especially for packing materials, as materials of that kind when uncomminuted cannot be seized by the screw.

It is therefore the object of the invention to so design equipment of the initially stated type that it operates with comparatively few parts, in simple and problem-free manner, and is adequate to receive bulky trash.

This problem is solved by the invention in that the arm of the post above the trash container is provided with a vertical shaft comprising at its lower end at least one horizontal support rotatably holding the roller, the roller by its own weight resting on the trash and the arm forming one part of a lift device located on the side of the post and permitting a roller stroke roller due to its own weight, the roller being constrained to perform a continuously alternating forward and backward motion.

This equipment makes it possible to seize and compress trash, in particular also when bulky, in problem-free manner, as the roller impacts the trash by its own weight, the possibility being provided hereby that if the trash is not reduced at once, the roller also can be lifted again from a lower into a higher position, assuring thereby uniform comminution without overloading the machine. A corresponding uniform comminution or reduction is impossible in the known equipment; therein the roller is always guided at the same compression level determined by the lifting device.

The invention offers another advantage over the known equipment in that due to the to-and-fro motion of the roller on the trash, wherein the roller furthermore reverses its direction of rotation after one or several revolutions, the trash will not tangle on the roller. Appropriately the reversal in direction of rotation takes place after one to five revolutions of the roller.

Such a reversal in direction of rotation is already out of the question in the known equipment because the screw can only feed the trash to be reduced in one direction.

The lifting device may consist of a guide device at the free end of the post-arm wherein the vertical shaft is guided in displaceable manner. To that end the shaft can be vertically displaceable by means of a gear rack or a chain drive, so that the lifting motion is effected to install the roller or to remove it. During the compaction the roller anyway and automatically moves upward because of the rising level of the material.

Where the arm of the post is desired to be moved by the lifting device, part of the post can be guided in telescoping manner in a further component.

The roller drive can be mounted within the roller itself, the end of the support holding the roller being rotatably supported with respect to the end of the shaft, making it possible for the roller to circulate.

Another possible drive consists in passing the shaft through an external spatially fixed pipe and to drive it by a motor mounted above the arm of the post or near its upper end, the roller-holding support being solidly joined to the shaft end. In this manner the shaft is made to turn by the external motor, whereby the roller is guided by its beam like an idle wheel over the trash.

Another possibility is to use the rotating shaft to drive a spur or bevel gear unit designed as a miter-gear unit in the vicinity of the roller axis and thereby to drive the roller. This type of drive results in relatively low stresses on shaft and bearings.

In the last cited two cases, the external spatially fixed pipe appropriately performs the lifting motion with respect to the arm of the post.

In lieu of one roller, it is possible also to provide two mutually opposite rollers because thereby a relatively uniform force transmission is achieved into the axis or shaft. In this instance the two rollers can be driven jointly by a bevel or planetary gear unit.

Advantageously the rollers are cylindrical because in that case there is a larger relative speed to the trash in the outer than inner region of the roller. Consequently the roller process trash is turned or twisted with respect to itself and accordingly an advantageous squeezing-through and hence improved compaction takes place.

The vertical shaft can be connected at its upper end by a spur-gear unit to a drive motor which in turn is coupled by a belt drive, preferably a toothed belt which in turn drives a spindle to adjust the height setting of the arm inclusive of the drive units mounted thereon and the roller. The engaging coupling appropriately can be mounted in the belt pulley.

The spindle adjustment controls the roller motion into or out of the container holding the trash.

To that end the spindle is supported in a preferably rectangular cross-sectional spindle pipe to the upper end of which is fixed a spindle nut. In turn the spindle pipe is displaceably guided in a guide carriage displaceable in the vertical post, the lower end of the spindle pipe resting as needed on the base plate or the like of the post.

The guide carriage is provided with guide rollers running in the guide grooves of the post. Appropriately three guide rollers are mounted each time in one cross-sectional plane, two of which engage sideways corresponding grooves of the post while the third guide roller points rearwards and engages a post groove provided there.

Several sets of these guide rollers can be provided along the height of the guide carriage depending on the statics of fastening needs.

It was found advantageous that at least two sets of guide rollers be mounted closer together in the upper section of the guide carriage than in the lower section because it was observed that in operation there is more irregular compression in the lower part of the container than in the upper, whereby additional bracing is required in the lower part. When compressing in the upper part, the sets of guide rollers if called for can also moved upward out of the grooves of the post.

It may be disadvantageous in the lower part of the container, that is when it holds still comparatively little material to be compacted and of a corresponding lesser elasticity, that the full weight of the roller inclusive its drive be resting on this thin stratum of material to be compacted, and therefore the invention further provides at least one spring between the carriage and the post whereby the pressure exerted by the roller in the lower part of the container on the material to be compacted will be decreased.

The spring can be a compression spring mounted between a cantilevered part of the guide carriage and the base of the post. However a tension spring may be very appropriate, which is connected by its upper end to the post and by its lower end to the guide carriage. The tension spring offers the advantage of eliminating the support housing required for a compression spring.

Appropriately the roller is provided on its circumference with teeth of triangular cross-sections engaging the trash to be compacted, these teeth being arrayed along a generatrix of the roller. In a preferred embodiment these teeth assume the shape of a tent-roof with an outwardly pointing tip in the direction of the free roller end face. Thereby jumping between the triangular teeth and the outer wall of the container are avoided, and moreover the teeth are prevented from deeply digging into the trash.

Other tooth shapes are possible provided the above stated criterion of the tooth tips pointing outward toward the free end face be observed.

The same object is met by a convex shape of the roller end face whereby its highest point shall be in the axial region, as in this manner too the trash to be compacted is prevented from jamming between the roller end face and the container inside wall.

In order that the trash at the container center can also be compacted by the roller, the invention furthermore provides a support foot in the region below the vertical shaft, resting on the trash and with a bottom surface located approximately in the same plane as the lowermost generatrix of the roller.

Appropriately the post in the equipment of the invention rests on a forked base plate into which can be inserted a pallet or the like holding the trash.

It is furthermore appropriate to construct the trash-receiving container as a bottomless enclosure provided with forward opening double doors, because the equipment of the invention makes it possible to so compress the trash that it will form a solid bale which can be removed by means of supports onto the pallet.

In order to prevent in that instance that the trash be forced out between the lower edges of this container enclosure and a lower support, for instance a pallet, the invention moreover provides flanges mounted perpendicularly or at a downward slant to the lower edges of the container walls which support the trash being compacted in the region of the lower edges of the said container walls and therefore prevent the trash from being laterally forced out between these lower edges and the support surface.

Appropriately, so it be possible to fill such a container to the upper edge, an upper container part appropriately can be set on this container, said upper part also being equipped with double swing doors so that the trash being compacted shall not be forced out in the last stage of compaction. Accordingly this container upper part also fills a safety function for the operator because preventing undesired access to the operational roller.

Appropriately the container upper part also is open at the top, whereby additional feed of trash is feasible when both container parts being closed.

To cover the spindle towards the container parts, a rail guide is mounted at the guide carriage, the side edges of this rail entering in grooves formed by plate angles of guide means at the container upper part.

The equipment operates as follows:

The lower container part is set by means of a support surface for the trash to be compacted, in particular a pallet between the two prongs of the post, onto the prongs, and then is closed.

Before that, the roller together with its drive had been moved upward by engaging the coupling between the drive motor and the belt drive actuating the spindle, whereby the spindle had been rotated and the spindle pipe had been moved down by the relative motion to its nut.

After the spindle pipe rests on the lower support surface of the post, the spindle in this manner moves the drive and the roller upwards.

Following the closure of the container, the spindle is actuated in the opposite direction and thereby the roller and its drive is lowered into the container, the roller becoming immediately operative because being constantly operationally coupled by the spur-gear unit to the motor.

As the roller keeps on operating, the lower container is gradually filled with more trash, the roller because of its own weight resting on the trash and compressing it, though simultaneously moving upwards. During this operation the spindle drive is disengaged, whereby both the guide carriage and the spindle pipe together with the spindle move upwards at the post when the roller does.

The weight of the roller or the pressure exerted by it is decreased in the manner already described by the spring mounted in the lower region of compression.

When the trash and hence the roller arrive at the upper edge of the lower container part, the spindle is actuated by engaging the spindle-drive coupling, whereby the roller is lifted off the trash and the entire drive inclusive of the upper container part is moved upwards.

BRIEF DESCRIPTION OF THE DRAWINGS

The invention is discussed in further detail below in relation to illustrative embodiments.

FIG. 1a shows a modification of FIG. 1 with a conical roller,

FIG. 8 is a detailed showing in cross-section of the roller 7 in FIG. 1.

DESCRIPTION OF THE PREFERRED EMBODIMENTS

Figure 1:
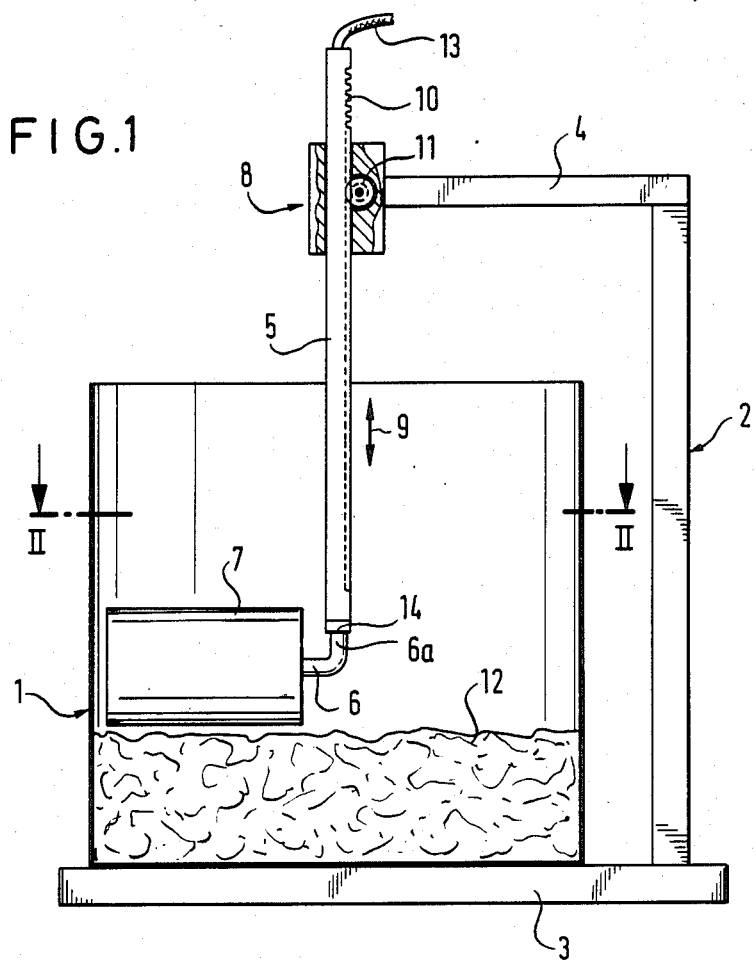
FIG. 1 is a schematic of an embodiment of the equipment of the invention.
Figure 2:
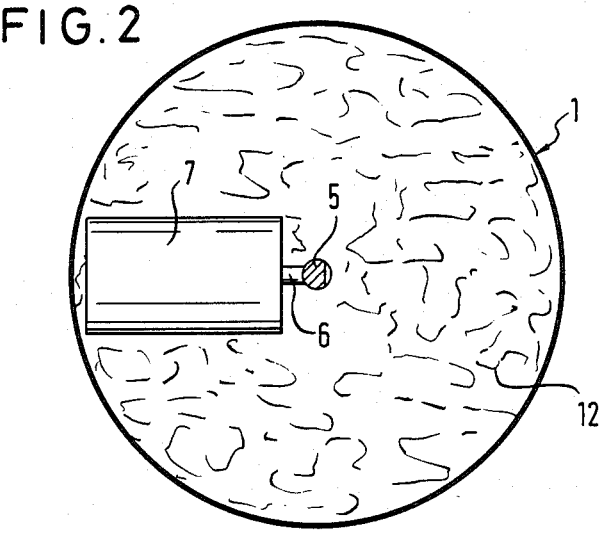
FIG. 2 is the section II—II of FIG. 1.

As shown in FIGS. 1 and 2, a cylindrical and upwardly open trash container 1 is provided wherein the trash will be compacted. The equipment of the invention in this case consists of a post 2 which may be connected to a base plate 3 passing underneath the container 1, the post 2 comprising an arm 4 passing over the trash container 1, said arm 4 being provided at its end with a vertical shaft 5 of which the lower end is provided with at least one horizontal beam 6 supporting in rotatable manner a cylindrical compacting roller 7.

In the illustrative embodiment of FIG. 1, the shaft 5 is guided within a lifting device 8 at the end of the arm 4 and thereby it can be moved up and down in the direction of the arrow 9. To that end the shaft may be actuated by a chain drive; in the embodiment of FIG. 1, a gear-rack or a gear-rack segment 10 is provided on the shaft 5 and engaged by a pinion 11 to move the shaft 5 up and down.

Because the roller 7 moves on the trash 12 being fed into the container 1, this roller 7 and hence also the shaft 5 are gradually raised as the container is being filled, the pinion 11 being capable of idle rotation.

To place the roller 7 into the container, or to remove it from same, the pinion 11 preferably can be rotated manually. Similar considerations apply to designing the lifting device as a chain drive.

In the embodiment of FIG. 1, the drive for the roller 7 is located within that roller, whereby no more is needed than feeding a power line 13 through the shaft 5 and the support 6 into the roller. Thereupon the roller performs a rotation relative to the non rotational support 6 and thereby rolls on the trash 12 within the container. The support 6 is rotatably supported by an angled section 6a approximately at 14 at the lower end of the shaft 5, whereby the roller 7 moves along a constrained circular path when in operation.

In the illustrative embodiment shown, the roller 7 is cylindrical, so that a higher relative speed to the trash is achieved in the external than the internal region of the roller. Thereby improved compression and compaction is achieved.

As shown in FIG. 8, the roller 7 has a baffel with roller seating journal 90, an electric motor 91, a gear unit 92, a drive axle 93, a bushing 94, a shim 95, a flange disc 96, a revolving roller 97, a race 98, a cross bar 99, a revolving drum 100, a drum cover 101, a motor seating ring 102, and a fastener 103.

In special cases, to achieve a constant relative speed, the roller 7a is conical, as shown in FIG. 1a.

Figure 3:
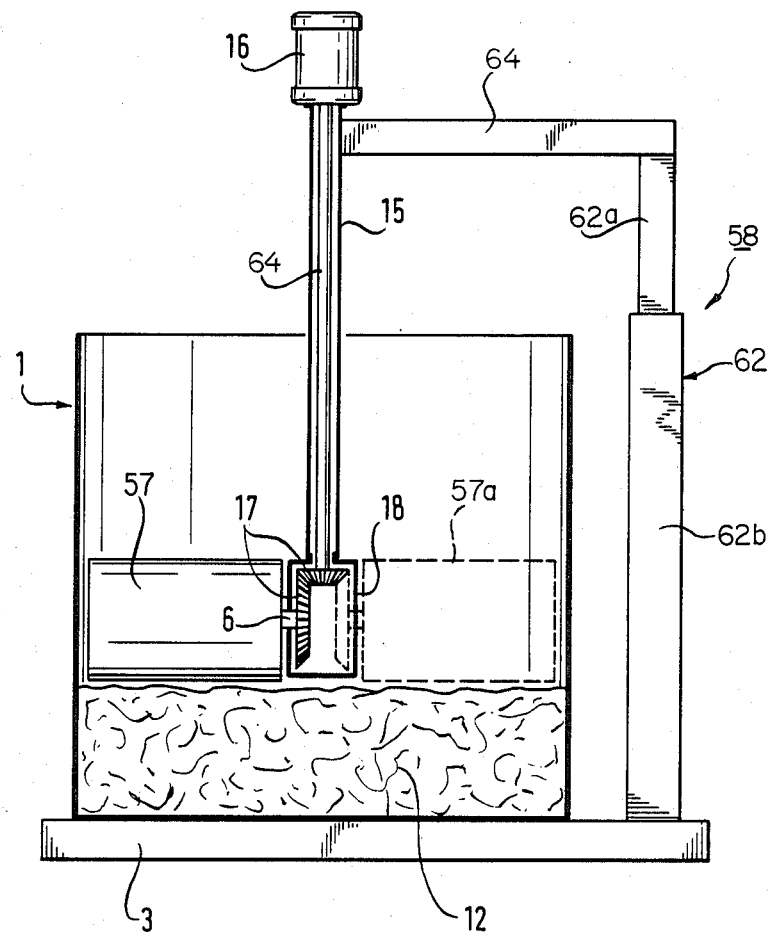
FIG. 3 is a schematic of a further embodiment.

FIG. 3 is a schematic similar to FIG. 1 but for a modified embodiment. A spatially fixed pipe 15 is mounted to the free end of the arm 64; the shaft 65 passes through this pipe 15 and is driven in this embodiment by means of a motor 16 mounted above the arm 64. The shaft 5 drives a miter-gear unit 17 which in turn actuates the roller 57 of which the support 6 in this embodiment is rotatable with respect to the bearing housing 18 of the miter-gear unit 17, said bearing housing 18 being rotatable with respect to the pipe 15. In this embodiment the the lifting device 58 consists in dividing the post 62 into parts, where one parts 62a enters in telescoping manner a further part 62b of the post.

As indicated by the dashed lines, further rollers 57a may be provided, preferably two mutually opposite ones. The two opposite rollers 57 and 57a can be driven in common by the correspondingly supplemented miter-gear unit 17.

In both embodiments the rollers are moved to and fro by first moving foward and then backward. The particular reversal takes place after one to five revolutions of roller 57.

Figure 4:
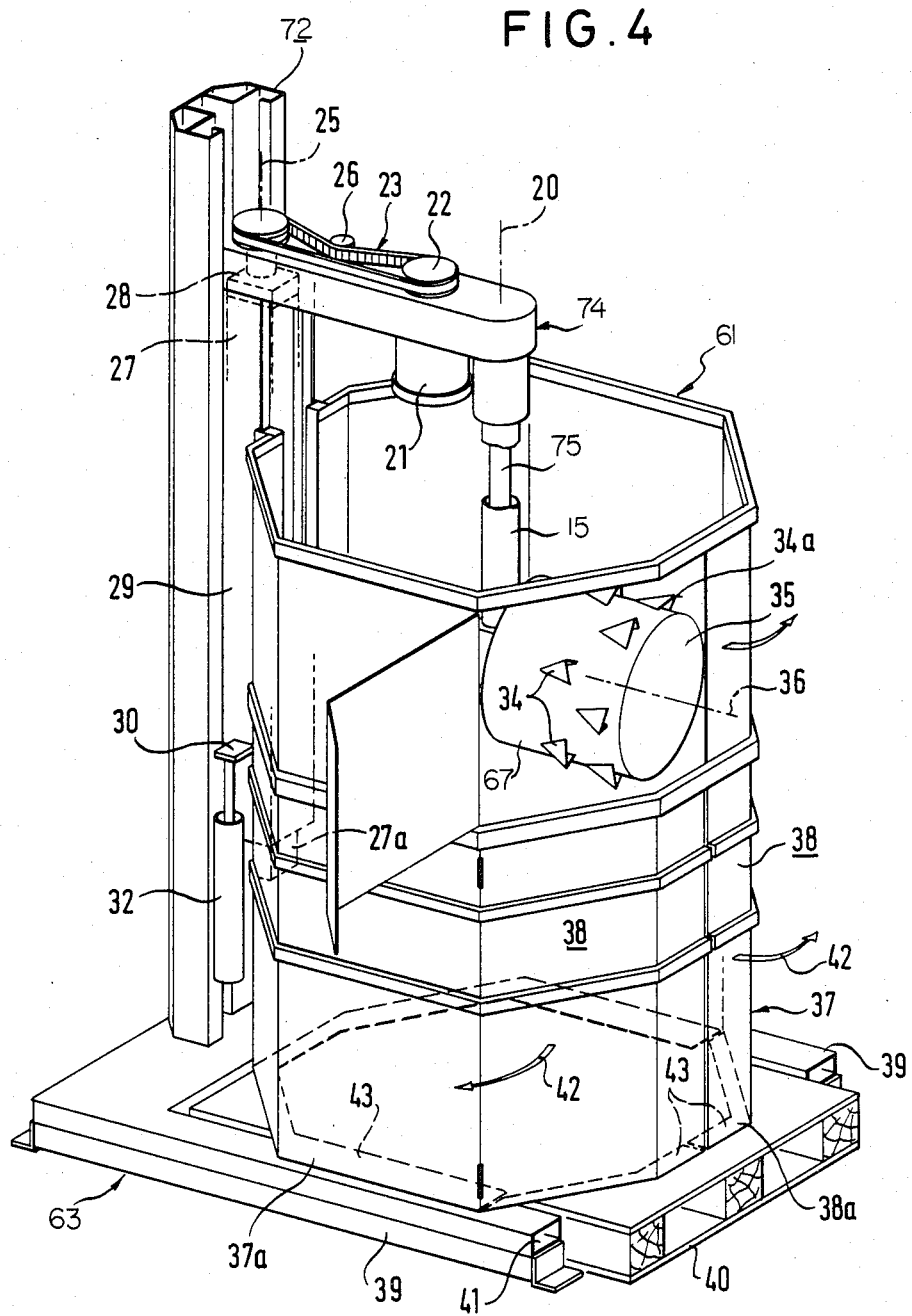
FIG. 4 is a perspective of an embodiment similar to FIG. 3 with further details.

FIG. 4 is a perspective of an illustrative embodiment of the invention, similar to FIG. 3, disclosing further details.

As shown in FIG. 4, the vertical rotating shaft 75 with an axis denoted by 20 in FIG. 4 mounted in the pipe 15 is connected at its upper end by a spur-gear unit to a drive motor 21 which in turn by means of a coupling to a belt pulley 22 actuates a belt drive 23 driving a spindle 25 (see FIG. 5) to adjust the height of the arm 74 inclusive of the gear units and the roller 67 mounted thereon. The axis of spindle 24 is denoted in FIG. 4 by 25.

Appropriately the belt drive 23 can be a toothed-belt drive of which the tensioning roller in FIG. 4 is denoted by 26.

The spindle 24 is supported in a spindle pipe 27 (also see FIG. 5) of preferably rectangular cross-section and at the upper end of which is a spindle nut 28 (FIG. 5) which is spatially fixed.

The spindle pipe 27 in turn is displaceable in a guide carriage 29 (also FIG. 5) mobile along the vertical post 72, the lower end 27a of the spindle resting if needed on the base plate 63 of the post 72.

A compression spring 31 may be mounted between a projecting part 30 of the guide carriage 29 and the post 72 or the base plate 63 to support the guide carriage in the lower operational region of the equipment. To prevent it from buckling, the compression spring 31 can be mounted in a guide pipe 32 which may be mounted to the post 72 or on the base plate 63. The compression spring can be loaded by a bar mounted to the part 30 and dipping into the guide pipe 32.

Figure 5:
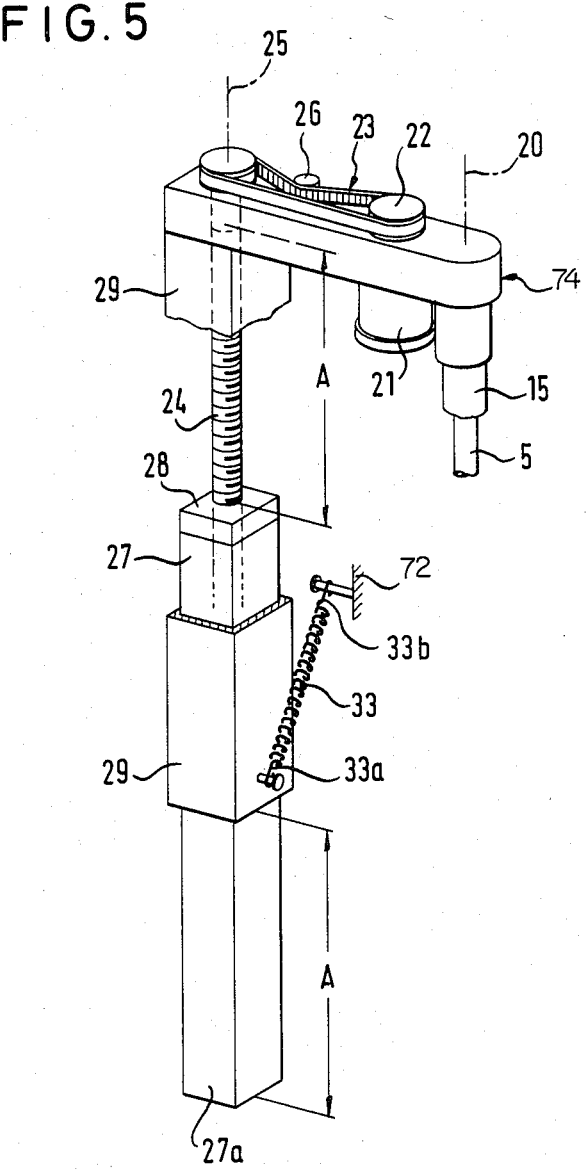
FIG. 5 is a perspective of part of the equipment of FIG. 4, where the arm was lifted by the spindle.

FIG. 5 shows another embodiment and consists in the spring being a tension spring 33 of which the lower end 33a acts on the guide carriage 29 and the upper end 33b on the post 72. In this way the force exerted by the tension spring during a descending motion of the guide carriage 29 reduces the operational pressure of the roller in the lower region.

As further shown by FIG. 4, the roller 67 is provided on its cylindrical surface with teeth 34 engaging the trash being compacted and in the shapes of tent roofs, whereby each forms an outwardly pointing tip 34a toward the free end face 35 of the roller. In this manner jamming between the triangular teeth 34 and the outer wall of the container 61 is prevented and furthermore the shape of teeth 34, pointing toward the axis 20 of the shaft 75 causes the trash to be compacted to be pulled from the outside to the inside.

Appropriately the end face 35 is convex (FIG. 6) whereby its highest point is in the vicinity of the axis 36 of the roller 77. Thereby any trash compressed between the end face 35 and the container inside wall is prevented from jamming there.

In the embodiment shown in FIG. 4, the container 61 consists of a lower container part 37 designed as a bottomless enclosure and provided with the double open-swinging doors 38.

As shown in FIG. 4, the base plate 63 therein is designed as a fork, with a pallet 40 bearing the trash to be compacted being inserted between the prongs 39. The prongs 39 can be provided with insertion apertures 41 for those of a fork lift or an industrial lifting truck or the like so the entire equipment be easily transportable.

FIG. 5 is a perspective of a portion of the equipment of the invention of FIG. 74 when the arm 4 is raised by the spindle 24.

When the coupling engages the belt pulley 22 and thereby the belt drive 23 is actuated, the geared drive motor 21 drives the spindle 24 which during actuation rotates with respect to the spindle nut and hence displaces downward the spindle pipe 27 until the lower end 27a of the spindle pipe rests on the base plate 63.

Because the lower part 27a of the spindle pipe 27 rests now on the base plate 63, further threading the spindle 24 in the spindle nut 28 causes the arm 74 to be raised into the position shown in FIG. 5, whereby it assumes a spacing A from its initial position. In that position the roller 67 is raised out of the container or at any event from the compressed trash.

When placing the roller into the container, i.e. when setting it on the trash to be compacted, this process takes place in reverse, first the spindle 24 is turned in spindle nut 28 when the guide pipe 27 rests on the base plate 63, so that the arm 74 is lowered together with the roller 67. The moment the roller rests on the trash to be compacted, the spindle pipe 27 is moved up by means of the spindle nut 28 and the roller then rests by its own weight on the trash.

The moment the spindle pipe 27 has been sufficiently removed from the base, whereby it no longer can impact it, the coupling is disengaged and the belt drive is shut down, so that the relative position between spindle and spindle pipe henceforth remains constant. The further strokes of the roller now take place exclusively because of the roller's own weight and that of the associated gearing, the guide carriage 29 moving with respect to the post 72 and, when compaction is yet inadequate, also to some extent again downward.

After the trash has been compressed, the double swing-open dooors 38 are opened in the direction of arrows 42 so that the compressed trash can be removed as a compact bale resting on the pallet 40.

To prevent the trash to be compacted from being forced out between the lower edges of the lower container part 37, flanges 43 are provided at the lower edges 37a of the container walls and/or at the lower edges 38a of the double swing doors 38, at right angles to their planes or slanting down, which support the trash to be compacted in the vicinity of the lower edges of the container walls and avoid laterally forcing out the trash between said walls and the receiving surface.

An upper container part 44 is set onto the lower container part 37; the upper container part 44 also is provided with the double swing-open doors 45. The upper container part 44 also is open at the top, whereby additional trash can be fed in when both container parts are closed.

Figure 6:
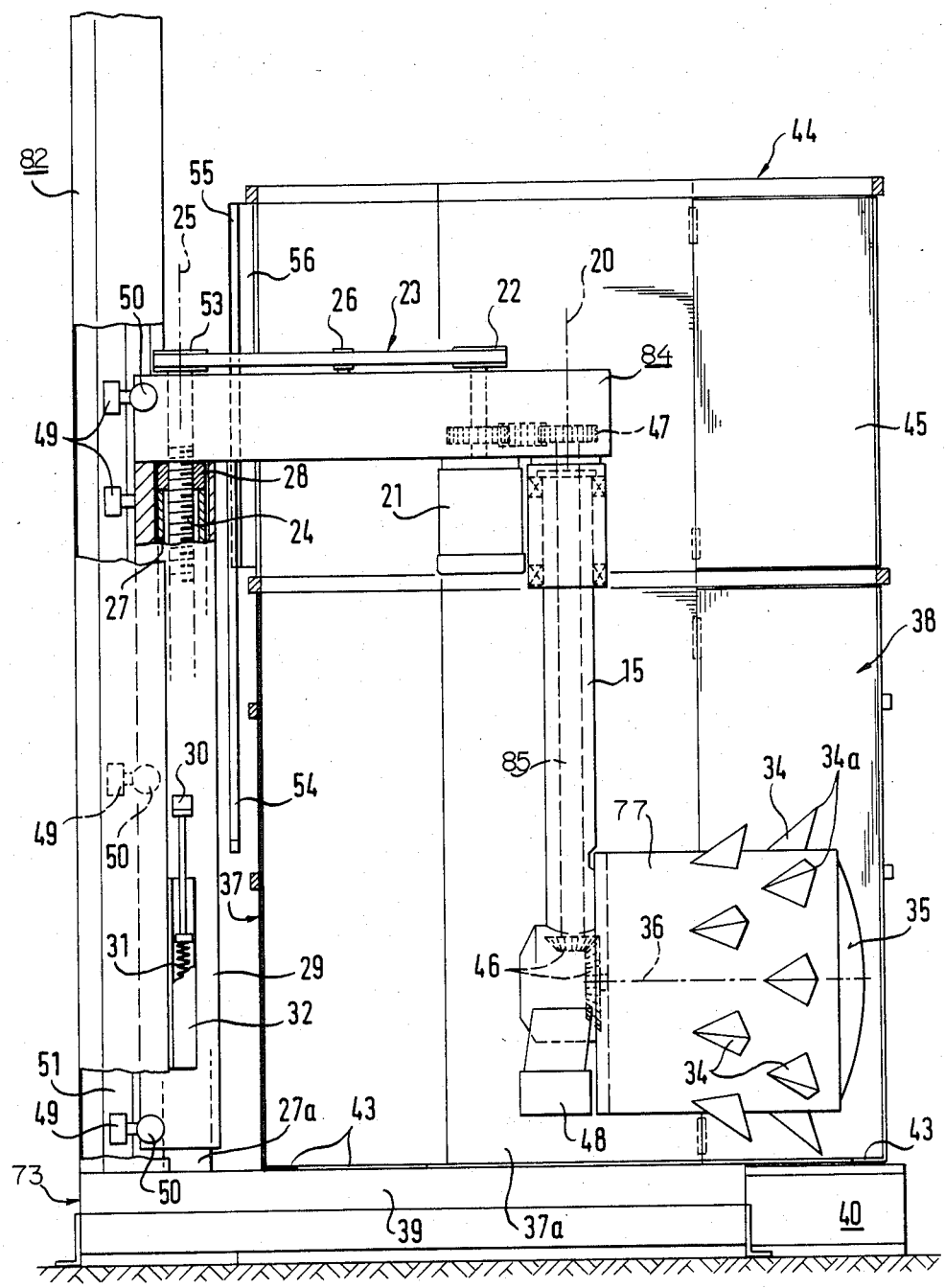
FIG. 6 is a sideview of a cut-out of the arrangement of FIG. 4.

FIG. 6 shows the equipment of FIG. 4 in sideview and in partly cut-out manner and in particular it shows a bevel-gear unit 46 being mounted at the lower end of the vertical rotatable shaft 85 and by means of the drive motor 21 and the schematically indicated spur-gear unit 47 and the shaft 85 driving the roller 77, the direction of rotation of the roller 77 being reversed after a few revolutions.

A rest foot 48 is mounted in the area underneath the vertical shaft 5, i.e. of the bevel-gear unit 46, which rests on the trash and of which the lower surface is located approximately in the same plane as that of the lowest generatrix of the roller 77. This rest foot is used to compress the trash also in the center of the container; this is something which cannot be done with the roller 7 for the embodiment shown.

Figure 7:
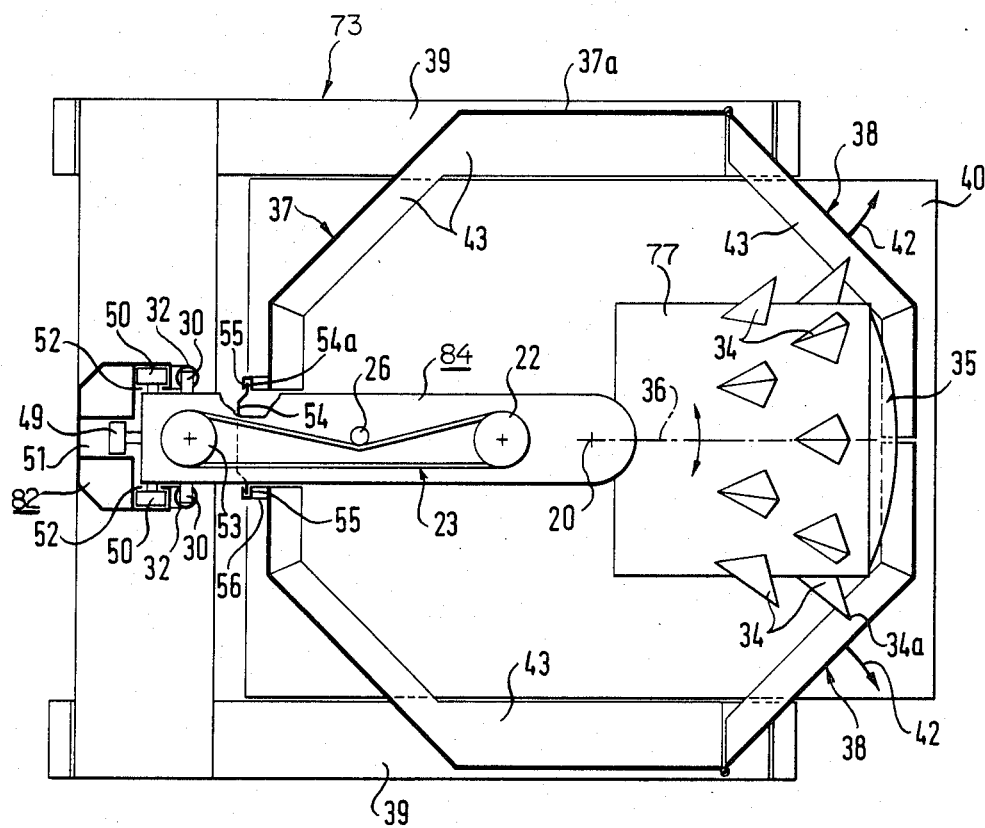
FIG. 7 is the topview of the arrangement of FIG. 4

FIG. 7 is a topview of the equipment of FIGS. 4 or 6 and reveals further details in the design of the guide carriage.

As shown by the FIGS. 6 and 7, the guide carriage 29 is provided with guide rollers 49 and 50 moving in guide grooves 51 and 52 (FIG. 7) of the post 82. Three guide rollers are arranged in each transverse plane, namely two lateral guide rollers 50 and a rearward-pointing guide roller 49, all engaging corresponding grooves of the post 82.

As shown by FIG. 6, several sets of guide rollers are mounted along the height of the guide slot 29, at least two sets of guide rollers being arranged more closely together in the upper section of the guide slot 29 than in the lower one.

As further shown by the FIGS. 6 and 7, a belt-pulley 53 is directly connected to the spindle 24, whereby the spindle is directly driven by the toothed belt drive 23.

Lastly FIG. 7 shows it is also possible to arrange two springs either side of the post 82, i.e. of the guide slot 29, the two springs in FIG. 4's embodiment being compression springs each mounted in a support casing 32 and each loaded by a projecting part 30 at the guide slot 29 (also see FIG. 6).

The spindle 24, i.e. its spindle pipe 27 is covered at the container side by a guide rail 54 mounted on the guide carriage 29; the side edges 54a of said guide rail 54 engage grooves 55 of guides 56 formed by angled plate in the upper container part. The rests already described are provided in the lower part of the guide rail 54 which provide support for the angled means in the upper container part 44 during an upward motion of the guide carriage 29 for the purpose of lifting the upper container part.

I claim:

1. In apparatus for compacting trash in a container open at the top which cooperates with compacting roller means entering the container and revolving within it on said trash in a circular manner while being supported from above said container, said compacting roller means carrying out a relative motion with respect to said container during compaction as said container is being filled, the improvement comprising:
   (a) a base under said container;
   (b) a post having a bottom end on said base and extending vertically from said base to an upper end;
   (c) an arm extending horizontally and having a first end on said upper end of said post and a second end over said container;
   (d) lifting means on said second end;
   (e) a vertical shaft adapted for engagement with said lifting means and having one end engaging said lifting means and another end;
   (f) at least one horizontal support provided at said another end;

(g) said compacting roller means rotatably mounted on said horizontal support and resting on said trash by its own weight; and (h) means for subjecting said compacting roller to continuously alternating forward and backward motion within said container.

2. The apparatus of claim 1, wherein said roller means has means for reversing direction of rotation after one to five revolutions.

3. The apparatus of claim 1, wherein said arm has means for vertical displacement.

4. The apparatus of claim 1, wherein said lifting means comprises guide means at said second end of said arm and within said lifting means said shaft is displaceably guided.

5. The apparatus of claim 1, wherein said lifting means comprise a gear rack on said vertical shaft cooperating with a pinion on said guide means.

6. The apparatus of claim 1, wherein said post comprises a first portion telescoping into a second portion.

7. The apparatus of claim 1, wherein said means for subjecting said compacting roller means to continuously alternating forward and backward motion is mounted within said roller means.

8. The apparatus of claim 1, wherein said shaft passes through an external, spatially fixed pipe and is driven by a drive motor mounted above said arm, said support for said roller means being rigidly joined to said another end of said shaft.

9. The apparatus of claim 8, wherein said outer, spatially fixed pipe carries out a stroke motion with respect to said arm.

10. The apparatus of claim 1, wherein said means for subjecting said compacting roller means to continuously alternating forward and backward motion comprises a drive motor mounted on said second end of said arm and drivingly connected to said shaft, said another end of said shaft engaging said roller means by a miter gear.

11. The apparatus of claim 10, wherein said shaft passes through an outer, spatially fixed pipe supporting at a lower end a bearing casing for said miter gear.

12. The apparatus of claim 1, wherein said compacting roller means comprise a plurality of rollers.

13. The apparatus of claim 12, wherein said plurality of rollers comprise two mutually opposite rollers.

14. The apparatus of claim 13, wherein said two rollers are driven jointly by miter gears.

15. The apparatus of claim 1, wherein said compacting roller means are cylindrical.

16. The apparatus of claim 1, wherein said compacting roller means are conical.

17. The apparatus of claim 1, wherein a geared motor is mounted on said arm, said post having a spindle for vertical adjustment, a spur gear unit operatively connecting said geared motor and engaging said one end of said vertical shaft and said geared motor also having a coupling engaging a belt drive for actuating said spindle.

18. The apparatus of claim 17, wherein said belt drive is a toothed belt drive.

19. The apparatus of claim 17, wherein said coupling is mounted in a belt pulley associated with said geared motor.

20. The apparatus of claim 17, wherein said spindle is supported in a spindle pipe of rectangular cross-section and to the upper end of which is mounted at least one spatially fixed spindle nut.

21. The apparatus of claim 20, wherein said spindle pipe is displaceably guided in a guide carriage moving within said post, a lower end of said spindle pipe capable of resting on said base.

22. The apparatus of claim 21, wherein a guide carriage is provided with guide rollers moving in guide grooves of said post.

23. The apparatus of claim 22, having three of said guide rollers mounted in one transverse plane, wherein two of said guide rollers engage said grooves which are laterally corresponding while said third guide roller points rearwards and engages a groove provided in said post.

24. The apparatus of claim 23, wherein several sets of said guide rollers are provided along a height of said guide carriage.

25. The apparatus of claim 24, wherein at least two sets of said guide rollers are mounted closer together in an upper section of said guide carriage than in a lower one.

26. The apparatus of claim 21, wherein at least one spring is mounted between said guide carriage and said post whereby pressure exerted in the lower region of said container by said roller means on said trash being compressed is reduced.

27. The apparatus of claim 26, wherein said spring is a compression spring mounted between a projecting part of said guide carriage and said post.

28. The apparatus of claim 26, wherein said spring is a tension spring having an upper end connected to said post and a lower arm connected to said guide carriage.

29. The apparatus of claim 22, wherein a guide rail is mounted on said guide carriage to cover said spindle, said rail having side edges engaging said grooves at an upper container part, where said grooves are formed by an angled plate.

30. The apparatus of claim 29, wherein a support surface is provided in the lower region of said guide rail to support plate angles of said upper container part when said guide carriage moves upward.

31. The apparatus of claim 17, further comprising a rest foot mounted underneath said vertical shaft, said rest foot resting on said trash and having a lower surface located approximately in the same plane as a lowest generatrix of said roller means.

32. The apparatus of claim 1, wherein said roller means is provided with teeth of triangular cross-section on a cylindrical surface which engage said trash and said teeth are arrayed along a generatrix of said roller means.

33. The apparatus of claim 32, wherein said teeth are in the shape of a tent roof with an outwardly pointing tip and project toward a free end face of said roller means.

34. The apparatus of claim 33, wherein said roller has an axis, said end face is convex, with said end face being at its highest point adjacent said axis of said roller means.

35. The apparatus of claim 1, wherein said base has a two prong fork shape with a pallet supporting said trash to be compacted insertable between said two prongs.

36. The apparatus of claim 35, wherein said prongs have free ends provided with insertion sockets to receive forks of a forklift.

37. The apparatus of claim 1, wherein said container receiving said trash includes a bottomless lower container part provided with double doors swinging open outward.

38. The apparatus of claim 37, further comprising flanges mounted to lower edges of said container walls of said lower container part at right angles to their planes, said flanges supporting said trash to be compressed in lower edges of said container walls.

39. The apparatus of claim 37, wherein an upper container part is set on said lower container part and is also provided with outwardly swinging double doors.

40. The apparatus of claim 39, wherein said container part is open at the top.

* * * * *